Patented Aug. 6, 1929.

1,723,411

UNITED STATES PATENT OFFICE.

ARTURO DOSSMANN, OF GENOA, ITALY.

PROCESS FOR THE TREATMENT OF SCRAP IRON.

No Drawing. Application filed August 4, 1927, Serial No. 210,730, and in Italy June 10, 1927.

Thins sheet scrap iron in comparison with an equal weight of heavy scrap has an infinitely larger surface and is generally covered with other substances in a higher percentage than heavy scrap. For this reason while the fusion as well as the welding of the heavy scrap is obtained relatively easily these operations are difficult and expensive and sometimes practically impossible in connection with light scrap and especially for light sheet scrap on account of its large surface and of its great quantity of impurities.

The object of the present invention is a process for the utilization of thin sheet scrap iron by means of which the same can be handled with the same facility as heavy scrap.

According to the methods hitherto known the thin sheet iron scrap is first subjected to a thorough cleaning to free it from heterogenous material in the form of impurities such as other metals, oxides, varnishes, salts and humidity by convenient operations for freeing the scrap from zinc, lead, tin, varnishes, further by pickling, washing, drying and so on by single treatments according to the requirements of the scrap in question. Among these operations the usual chemical operations and mainly those of electrochemical character are based on the oxidation of these heterogeneous materials and subsequent dissolution in other substances.

These heterogeneous materials which cover the commercial scrap are not distributed on its surface in an uniform manner and thus the treatment must sometimes be prolonged beyond the duration of treatment which otherwise would be required.

It sometimes happens that in some parts of the material to be treated there are formed insoluble oxides, which remain upon the scrap despite treatments to which it is subjected.

This occurs for instance along the soldering lines of tin boxes freed from tin, upon the surfaces of leaded scrap which is only insufficiently freed from the lead and upon that scrap of sheets which had been varnished with lead varnishes and badly liberated from the varnish.

It happens now that some of these insoluble oxides which are superoxides are only reduced with difficulty and they detrimentally influence the scrap when same is subjected to the oxidizing heat treatment.

Such a detrimental influence is explained to a certain degree as a phenomenon of catalysis inasmuch as in the presence of heat the superoxides of the impurities give up a part of their oxygen to the scrap in oxidizing it and take up oxygen from the oxidizing flame so that the oxidizing operation further continues and generates in the finished material occlusions of ferric oxide or enormous quantities of waste material.

In such cases it is necessary that the known preparatory cleaning operation of the scrap (liberation of the scrap from zinc, lead, tin, varnish, pickling, washing and drying) is followed by a treatment capable of diminishing the degree of oxydation of the residues left on the scrap so as to render them soluble.

In the case of tinplate scrap freed from tin it happens that if the scrap is even completely freed from the tin, the presence within the scrap of soldered boxes promotes the presence of insoluble lead peroxide ($PbO_2$).

This combination in order to be rendered soluble must be reduced by means of a reducing agent to a lower oxide PbO so that the lower oxide can be dissolved in a solvent.

For instance a hot preferably boiling solution of caustic soda (7–10 per cent) containing soluble hydrocarbons as, for instance, molasses (10–20 per cent) allows the mentioned reduction of the lead peroxide and its perfect solution, that is its removal; this treatment can still be further improved by a subsequent washing of the scrap in running water.

After the cleaning steps have been accomplished the scrap is subjected in the known manner to an elevated pressure and briquettes produced of such a density that the penetration of the heating gas during the thermic treatment is reduced to a minimum.

Having now particularly described and ascertained the nature of my said invention and in what manner the same is to be performed, I declare that what I claim is:—

Process for the treatment of tinned scrap iron for converting insoluble lead peroxide adhering to the scrap into soluble lead monoxide which includes as a step the immersion of the scrap in a bath of a boiling solution of about 7–10 per cent of caustic soda and 12–20 per cent of molasses.

In testimony whereof I have signed my name to this specification.

ING. ARTURO DOSSMANN.